United States Patent
Fan

[19]

[11] Patent Number: 6,125,580
[45] Date of Patent: Oct. 3, 2000

[54] SELF WATERING TRAY

[76] Inventor: Jian-Hua Fan, 5800 Maudina Ave., Apt. #C-2, Nashville, Tenn. 37209

[21] Appl. No.: 09/119,176

[22] Filed: Jul. 20, 1998

[51] Int. Cl.⁷ ..................................................... A01G 27/04
[52] U.S. Cl. ........................................... 47/80; 47/8; 47/1
[58] Field of Search .................................. 47/79, 80, 81, 47/39, 71

[56] References Cited

U.S. PATENT DOCUMENTS

| | | | |
|---|---|---|---|
| D. 250,401 | 11/1978 | O'Shea et al. | D11/152 |
| D. 313,203 | 12/1990 | Carlson . | |
| 320,588 | 6/1885 | Rhoads . | |
| D. 352,480 | 11/1994 | Carlson | 47/79 X |
| D. 363,255 | 10/1995 | Helms et al. . | |
| D. 384,907 | 10/1997 | Moskowitz | D11/152 |
| 1,216,642 | 2/1917 | White | 47/80 |
| 1,778,150 | 10/1930 | Freeburg . | |
| 2,072,185 | 3/1937 | Schein . | |
| 3,027,684 | 4/1962 | Keiding | 47/65.7 |
| 3,220,144 | 11/1965 | Green | 47/80 |
| 3,611,633 | 10/1971 | Shackelford . | |
| 3,866,351 | 2/1975 | Cobia . | |
| 3,965,616 | 6/1976 | Ridgeway . | |
| 3,990,179 | 11/1976 | Johnson et al. . | |
| 4,092,804 | 6/1978 | Morris et al. . | |
| 4,224,764 | 9/1980 | Dziewulski et al. . | |
| 4,231,187 | 11/1980 | Greenbaum | 47/80 |
| 4,250,665 | 2/1981 | English et al. | 47/81 |
| 4,299,055 | 11/1981 | Dziewulski et al. | 47/66.1 |
| 4,324,070 | 4/1982 | Swisher | 47/81 |
| 4,339,891 | 7/1982 | Bassett | 47/81 X |
| 4,344,251 | 8/1982 | Edling | 47/80 |
| 4,442,629 | 4/1984 | Anderson . | |
| 4,553,352 | 11/1985 | Powell et al. | 47/71 |
| 4,760,987 | 8/1988 | Lan . | |
| 4,833,823 | 5/1989 | Edwards, III . | |
| 4,880,156 | 11/1989 | Wallet . | |
| 4,885,869 | 12/1989 | Kim | 47/79 |
| 4,885,870 | 12/1989 | Fong | 47/79 |
| 4,937,974 | 7/1990 | Costa, Jr. et al. | 47/81 |
| 4,975,251 | 12/1990 | Saceman . | |
| 5,209,013 | 5/1993 | Sellers . | |
| 5,309,670 | 5/1994 | Bates . | |
| 5,797,217 | 8/1998 | Magee . | |
| 5,806,241 | 9/1998 | Byland et al. | 47/81 |

FOREIGN PATENT DOCUMENTS

| | | | |
|---|---|---|---|
| 579120 | 3/1924 | France | 47/81 |
| 1024483 | 4/1953 | France | 47/80 |
| 1263364 | 5/1961 | France | 47/80 |
| 649568 | 6/1964 | France | 47/81 |
| 1554194 | 10/1968 | France | 47/81 |
| 1 200 604 | 9/1965 | Germany | 47/80 |
| 25 39 552 A1 | 3/1977 | Germany . | |
| 2539552 | 3/1977 | Germany | 47/81 |
| 32131282 A1 | 2/1983 | Germany | 47/79 |
| 3510513 A1 | 9/1986 | Germany | 47/79 |
| 6-141683 | 5/1994 | Japan | 47/81 |
| 308827 | 8/1955 | Switzerland | 47/80 |
| 4743 | of 1900 | United Kingdom | 47/79 |
| 22647 | of 1912 | United Kingdom | 47/80 |
| 1112153 | 5/1968 | United Kingdom | 47/79 |
| 1192431 | 5/1970 | United Kingdom | 47/81 |
| 2240250 | 7/1991 | United Kingdom | 47/79 |

Primary Examiner—Jack W. Lavinder
Assistant Examiner—Jeffrey L Gellner
Attorney, Agent, or Firm—Merchant & Gould P.C.

[57] ABSTRACT

A self watering tray apparatus for supporting a pot having a plant therein includes a tray for holding a fluid having a bottom and a side wall, a support being retained between the bottom and side wall of the tray, and a plug-in leg or wick filled with a fluid absorbing material such as soil or wick. The plug-in leg wicks up the fluid to the soil whenever the fluid is needed by the plant and drains the fluid down to the tray whenever the fluid in the pot is excessive to the plant.

5 Claims, 3 Drawing Sheets

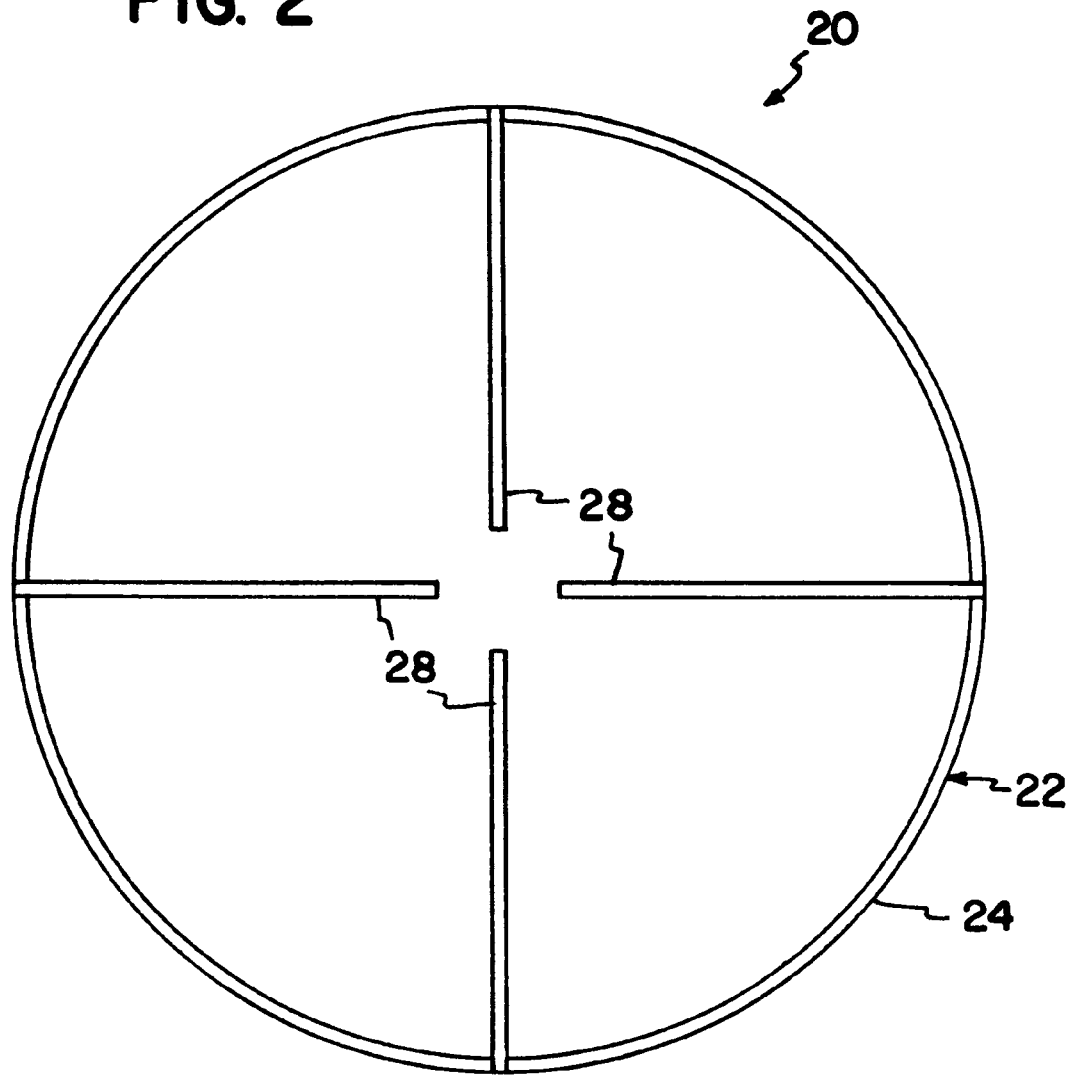

SELF WATERING TRAY

BACKGROUND OF THE INVENTION

I. Field of the Present Invention

The present invention relates to a tray, more particularly to a self watering tray for holding a pot.

II. Description of the Prior Art

People usually use a tray to hold water that is drained from a pot to avoid water spilling onto the floor. The roots of a plant would become damaged if the tray is holding too much water.

SUMMARY OF THE INVENTION

The present invention relates to a tray, more particularly to a self watering tray for holding a pot.

The present invention discloses a self watering tray which allows water to be sucked by plug-in leg(s) into the pot whenever needed by the plant. The advantages of the present invention include that root damages would be avoided while reducing the watering frequency.

In one embodiment of the present invention, a tray apparatus for holding water that is drained from a pot having a plant therein, includes a tray having a bottom and a side wall, a plurality of supports retained between the bottom and side wall of the tray to separate a pot from water, and a plurality of plug-in legs to suck up water to the plant in the pot.

BRIEF DESCRIPTION OF THE DRAWINGS

A better understanding of the construction and operational characteristics of a preferred embodiment(s) can be realized from a reading of the following detailed description, especially in light of the accompanying drawings in which like reference numerals in the several views generally refer to corresponding parts.

FIG. 2 is a top view of the self watering tray apparatus as shown in FIG. 1A.

DETAILED DESCRIPTION OF THE PREFERRED EMBODIMENTS

The present invention relates to a tray, more particularly to a self watering tray for holding a pot.

The present invention discloses a self watering tray which allows water to be sucked by plug-in leg(s) into the pot whenever needed by the plant. The advantages of the present invention include that root damages would be avoided while reducing the watering frequency.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1A:
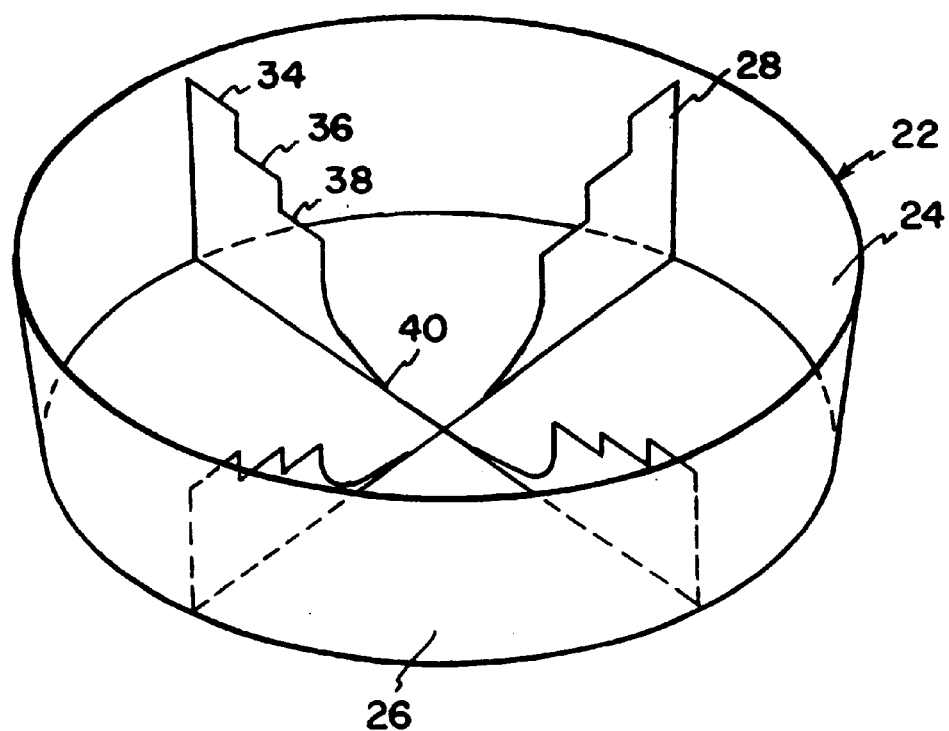
FIG. 1A is a perspective view of one embodiment of a self watering tray apparatus in accordance with the principles of the present invention.
Figure 1B:
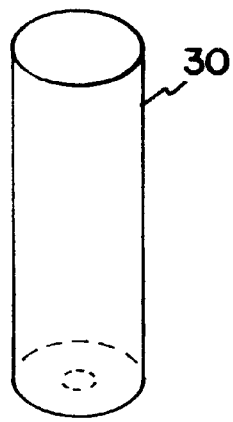
FIG. 1B is a perspective view of one embodiment of a plug-in leg of the self watering tray apparatus in accordance with the principles of the present invention.
Figure 1C:
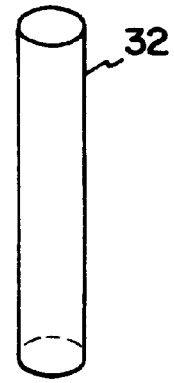
FIG. 1C is a perspective view of another embodiment of a plug-in leg of the self watering tray apparatus in accordance with the principles of the present invention.
Figure 3A:
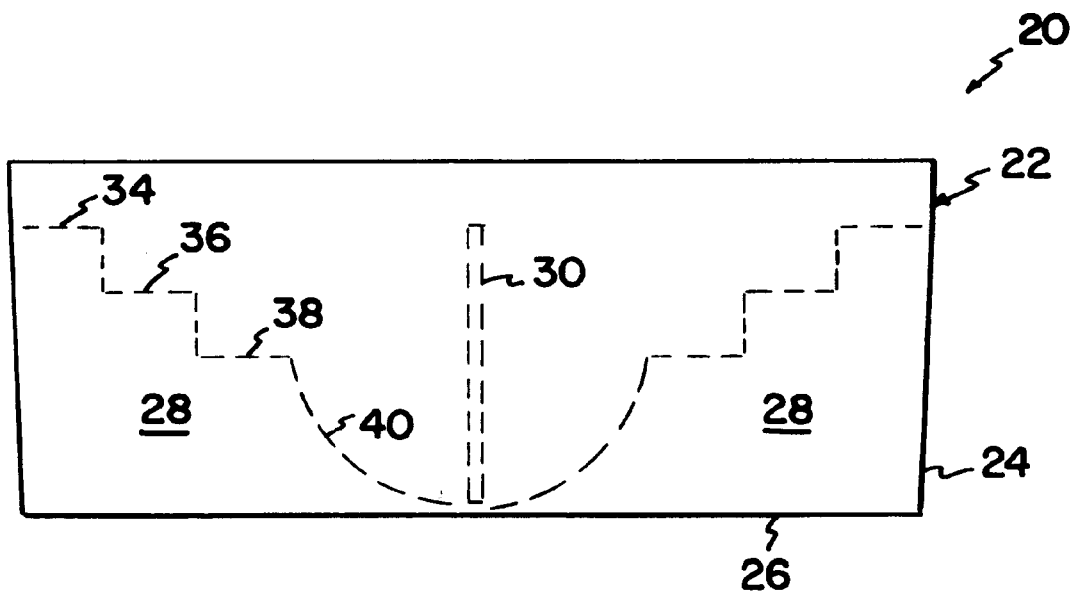
FIG. 3A is a perspective view of a front side view of the self watering tray apparatus as shown in FIG. 1A having the plug-in leg in the tray apparatus.
Figure 3B:
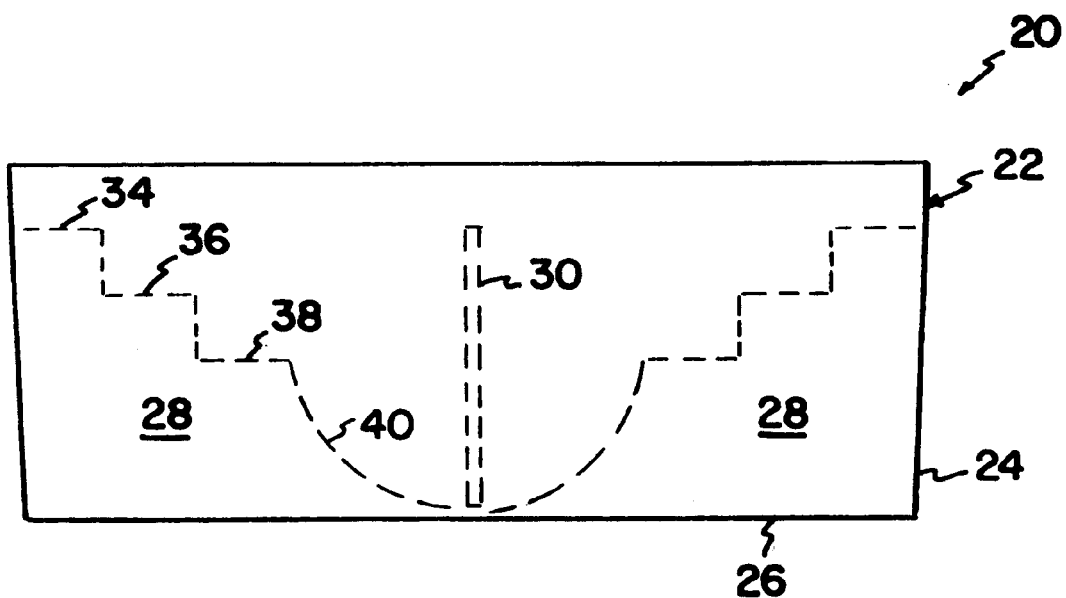
FIG. 3B is a perspective view of a left side view of the self watering tray apparatus as shown in FIG. 1A having the plug-in leg in the tray apparatus.

In FIGS. 3A–B, there is, generally illustrated by reference numeral 20, a self watering tray apparatus in accordance with the principles of the present invention. FIGS. 1A–C illustrate the parts of the tray apparatus 20. The tray apparatus 20 includes a tray 22 having a side wall 24 and a bottom 26, a support 28, and a plug-in leg 30 or 32.

The support 28 is retained between the side wall 24 and the bottom 26 It will be appreciated that the support 28 can be removably disposed between the side wall 24 and the bottom 26. As shown in FIGS. 1A, 3A, and 3B, the support 28 has a plurality of step sections 34, 36, 38, and 40. The step sections are configured to receive and retain a plant pot (not shown) with different sizes.

The tray 22 holds a fluid or water for the plant in the pot. The water is sucked up by plug-in leg(s) which is attached to the pot, whenever needed by the plant. Also, the tray holds the fluid or water that is drained from a pot.

FIG. 1B shows one type of plug-in leg 30 which is filled with soil. FIG. 1C shows another type of plug-in leg 32 which is filled with wick. The plug-in leg 30,32 can be inserted into the pot (not shown) such that the water in the tray 22 can be sucked up by the plug-in leg 30,32 whenever needed by the plant.

In the present invention, the support 28 is used to separate the pot (not shown) from the fluid or water, and the plug-in leg 30,32 is used to suck up water to the plant in the pot (not shown). It is appreciated that the tray can be made in different sizes. The number of supports 28 can be varied, for example three or more. Further, the tray 22 can be made in different materials and styles.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A self watering tray apparatus for supporting a pot having a plant therein, comprising:
    a tray, for holding a fluid, having a bottom and a side wall;
    a support being retained between the bottom and side wall of the tray; and
    a plug-in leg filled with a fluid absorbing material, the plug-in leg sucking up the fluid to the plant whenever the fluid is needed by the plant and draining the fluid down to the tray whenever the fluid in the pot is excessive to the plant.

2. The tray apparatus of claim 1, wherein the plug-in leg is detachably mounted on the bottom of the tray.

3. The tray apparatus of claim 1, wherein the fluid absorbing material is a wick.

4. The tray apparatus of claim 1, wherein the fluid absorbing material is soil.

5. The tray apparatus of claim 1, wherein the support has a plurality of step sections for retaining the pot with a different size.

* * * * *